United States Patent [19]

Watanabe et al.

[11] Patent Number: 5,420,185
[45] Date of Patent: May 30, 1995

[54] WIRE ON CABLE COATED WITH A BOW-TIE TREE RESISTANT ELECTRICAL INSULATING COMPOSITION

[75] Inventors: Kiyoshi Watanabe; Takanori Yamazaki; Hideki Yagyu; Mamoru Kanaoka; Katsutoshi Hanawa; Chuki Ikeda, all of Ibaraki, Japan

[73] Assignee: Hitachi Cable Ltd., Tokyo, Japan

[21] Appl. No.: 305,754

[22] Filed: Sep. 14, 1994

Related U.S. Application Data

[63] Continuation of Ser. No. 154,127, Nov. 18, 1993, abandoned, which is a continuation of Ser. No. 210,451, Jun. 23, 1988, abandoned.

[30] Foreign Application Priority Data

Jun. 24, 1987 [JP] Japan .................. 62-157037
Mar. 29, 1988 [JP] Japan .................. 63-75741

[51] Int. Cl.$^6$ ............................ C08K 5/098
[52] U.S. Cl. ................... 524/210; 524/223; 524/224; 524/232; 524/300; 524/315; 524/318; 524/320; 524/322; 524/523; 524/524; 524/528; 524/562; 524/563; 524/579; 524/581; 524/583; 524/585; 524/587; 174/23 C; 174/110 SR
[58] Field of Search ............... 524/210, 223, 224, 232, 524/300, 315, 318, 320, 322, 523, 524, 528, 563, 579, 581, 583, 585, 587; 174/23 C, 110 SR

[56] References Cited

U.S. PATENT DOCUMENTS

| | | | |
|---|---|---|---|
| 3,474,058 | 10/1969 | Ridgeway et al. | 524/230 |
| 4,345,046 | 8/1982 | Ejk et al. | 524/223 |
| 4,400,429 | 8/1983 | Barlow et al. | 524/318 |
| 4,871,787 | 10/1989 | Yamamoto et al. | 524/87 |

OTHER PUBLICATIONS

Billmeyer, Jr. Fred W., *Textbook of Polymer Science*, 3rd Ed., John Wiley and Sons, New York, 1984, p. 370.
Derwent Abstract Accession No. 84-032495/06, J58220304-A (Dec. 1983).
IEEE Transactions on Power Delivery, vol. PWRD-, No. 1, 1986, New York US, pp. 27-33; K Watanabe et al.: "Development of New Water Tree Suppressive XLPE Cable".

*Primary Examiner*—Romulo H. Delmendo
*Attorney, Agent, or Firm*—Sughrue, Mion, Zinn, Macpeak & Seas

[57] ABSTRACT

A bow-tie tree resistant electrical insulating composition comprises 100 parts by weight of at least one polymer selected from polyolefins and ethylene copolymers, 0.005-1.0 part by weight of a metal salt of a fatty acid containing a hydroxyl group in the molecule, and 0.005-1.0 part by weight of a fatty acid or a derivative thereof.

18 Claims, No Drawings

WIRE ON CABLE COATED WITH A BOW-TIE TREE RESISTANT ELECTRICAL INSULATING COMPOSITION

This is a continuation of application No. 09/154,127, filed Nov. 18, 1993, abandoned, which is a continuation of application Ser. No. 07/210,451, filed Jun. 23, 1988.

FIELD OF THE INVENTION

The present invention relates to an electrical insulating composition having improved bow-tie tree resistance. More particularly, the present invention relates to an electrical insulating composition that can be applied to insulators for electric wires or cables so as to obtain long-term stability.

BACKGROUND OF THE INVENTION

Polyolefins typified by polyethylene, as well as ethylene copolymers and their crosslinked products, generally exhibit excellent electrical insulating properties and have been extensively used as insulating materials for power cables and other electrical equipment.

However, if these materials are used either under wet conditions or in the water, their high insulating performance will be greatly impaired because of the growth of bow-tie trees in the insulations. In the worst case, the bow-tie trees might pass through the insulation layer to cause an accident of dielectric breakdown. The bow-tie trees can be explained by the phenomena that water molecules in a gaseous phase that permeate the insulation upon current application diffuse into fine imperfections such as foreign matters and microvoids; as they condense, the water molecules will grow enough to distort the polymer chains and eventually the water displaces the latter and emerges in the form of bow-tie tree from the insulation.

With the state of the art, the occurrence of imperfections in the insulation such as foreign matters and microvoids can be prevented to some extent by controlling the quality of resins or improving the cable fabrication technology but it is still impossible to eliminate all such imperfections. So long as foreign matters and microvoids which provide nuclei for bow-tie trees remain, it is essential to prevent excessive concentration of the water in imperfections. To this end, water must be uniformly distributed in the insulation so as to render the resin appropriately hydrophilic.

Based on this observation, it has been proposed that an aliphatic acid containing a hydroxyl group in the molecule or a metal salt thereof can be added to a polyolefin or an ethylene copolymer, to significantly improve the resistance to bow-tie trees of the polymer (Japanese Patent Laid-Open Application No. 220304/1983).

However, even this method is incapable of complete prevention of the occurrence of bow-tie trees. In order to enhance the long-term reliability of crosslinked polyethylene insulated cables for high voltages and various other electrical equipment, further improvements in their resistance to bow-tie trees are desired.

SUMMARY OF THE INVENTION

Therefore, it is an object of the present invention to provide an electrical insulating composition having much more improved resistance to bow-tie trees.

The object of the present invention is attained by a bow-tie tree resistant electrical insulating composition which comprises 100 parts by weight of at least one polymer selected from a polyolefin and an ethylene copolymer, 0.005–1.0 part by weight of a metal salt of a fatty acid containing a hydroxyl group in the molecule, and 0.005–1.0 part by weight of a fatty acid or a derivative thereof.

DETAILED DESCRIPTION OF THE PREFERRED EMBODIMENTS

Examples of the polyolefin that can be used in the present invention include low-density polyethylene, high-density polyethylene, polypropylene and polybutene. Examples of the ethylene copolymers that are suitable for use in the present invention include an ethylene-vinyl acetate copolymer, an ethylene-ethyl acrylate copolymer, an ethylene-methyl methacrylate copolymer, and an ethylene-propylene copolymer. These polyolefins and ethylene copolymers may be used alone or in combination.

The metal salt of the fatty acid containing a hydroxyl group in the molecule is a metal salt of a hydroxy-fatty acid as represented by the general formula $M(RCOO)_n$, where M is a metal that is exemplified by but not limited to a metal of group I of the periodic table such as Li and Na, a metal of group II such as Mg, Ca, Ba, Cd and Zn, a metal of group III such as Al, a metal of group IV such as Sn and Pb, a metal of group VII such as Mn, and a metal of group VIII such as Co and Ni; n represents the atomic valence of the metal M and is an integer of not greater than 4; and R is an aliphatic hydrocarbon radical containing a hydroxyl group and which has 8–22 carbon atoms. R may contain in the structure an atom such as oxygen, nitrogen and sulfur or an atomic group comprising them.

Specific examples of the metal salt of the fatty acid containing a hydroxyl group in the molecule include: calcium hydroxystearate, aluminum hydroxystearate, zinc hydroxystearate, lead hydroxystearate, barium hydroxystearate, lithium hydroxystearate, magnesium hydroxystearate, calcium ricinoleate, aluminum ricinoleate, zinc ricinoleate, lead ricinoleate, barium ricinoleate, lithium ricinoleate and magnesium ricinoleate.

The metal salt of the fatty acid containing a hydroxyl group in the molecule must be incorporated in an amount of from 0.005 to 1.0 part by weight per 100 parts by weight of the polymer component selected from a polyolefin and an ethylene copolymer. If the metal salt the fatty acid is used in an amount of less than 0.005 parts by weight, it will not exhibit a sufficient effect to prevent bow-tie treeing. If it is used in an amount exceeding 1.0 part by weight, its limited miscibility with the resin causes "blooming" of the metal salt on the surface of the insulation.

The present inventors have found that a considerable improvement of bow-tie tree resistance could be attained by employing in combination the metal salt of the fatty acid containing a hydroxyl group in the molecule and a fatty acid or a derivative thereof.

Illustrative fatty acids include stearic acid, hydroxystearic acid, capric acid, lauric acid, myristic acid, palmitic acid, behenic acid and montanic acid.

Typical examples of the derivatives of such fatty acids are fatty acid esters and fatty acid amides.

Specific examples of fatty acid esters include: butyl stearate, methyl stearate, methyl oleate, stearyl stearate, ethylene glycol monostearate, montanic acid ester, glycerol monooleate, glycerol monostearate, glycerol monohydroxystearate, glycerol monoricinoleate, glycerol tristearate, glycerol trihydroxystearate, glycerol tribehenate, and partially saponified montanic acid ester.

Fatty acid amides are nitrogenous derivatives fatty acids and are represented by the general formula $RCONH_2$, where R is an aliphatic hydrocarbon radical having 8-22 carbon atoms and which may be saturated or unsaturated or may contain a hydroxyl group. Moreover, R may contain in the structure an atom such as oxygen, nitrogen or sulfur or an atomic group comprising them. Substituted fatty acid amides represented by the general formulas RCONHR' where R' is a $C_{8-22}$ aliphatic hydrocarbon radical as defined by R, or an alkylol group, and $(RCONH)_2R''$, where R'' is an alkylene group, are also effective.

Specific examples of the fatty acid amide include: stearic acid amide, oleic acid amide, erucic acid amide, hydroxystearic acid amide, palmitic acid amide, N,N'-ethylenebis(hydroxystearic acid)amide, N,N'-methylenebis(hydroxystearic acid)amide, N,N'-hexamethylenebis(hydroxystearic acid)amide, N,N'-ethylenebis(stearic acid)amide, N,N'-methylenebis(stearic acid)amide, and N,N'-xylylenebis(hydroxystearic acid)amide.

The amount of the fatty acids or derivatives thereof described above must be in the range of from 0.005 to 1.0 part by weight per 100 parts by weight of the polymer component selected from polyolefins and ethylene copolymers. If this amount is less than 0.005 parts by weight, the metal salt of the fatty acid containing a hydroxyl group in the molecule will not fully exhibit the effect of preventing bow-tie treeing. If this amount exceeds 1.0 part by weight, the limited miscibility with the resin will cause blooming of the fatty acid or derivative thereof on the insulation. Antioxidants are used in amounts of 0.01-1.0 part by weight.

If desired, the insulating composition of the present invention may contain other additives such as antioxidants, lubricants, and fillers such as carbon black. Illustrative antioxidants include amine-based antioxidants such as phenyl-α-naphthylamine and N,N'-di-β-naphthyl-p-phenylenediamine, and phenolic antioxidants such as 4,4'-thiobis(3-methyl-6-tert-butylphenol) and a hindered phenol.

The composition of the present invention can advantageously be used to form an insulation on an electric cable. To do this, the composition is applied on the outer periphery of a conductor either directly or via a semiconductive layer, to form an electrical insulating layer, which may be crosslinked or may remain uncrosslinked.

If the insulation coating is to be crosslinked, the common practice dictates thermal crosslinking in the presence of a peroxide-based crosslinking agent typified by dicumyl peroxide, 1,3-bis(tert-butyl-peroxy-isopropyl)-benzene or 2,5-dimethyl-2,5-di(tert-butyl-peroxy)hexyne-3. Other methods of crosslinking may of course be employed, such as hydrosilicon crosslinking, wherein an organic silane such as vinyl triethoxysilane is grafted onto the polymer and thereafter brought into contact with moisture so as to achieve bonding of silane molecules in the presence of a silanol condensation catalyst, and crosslinking by an ionizing radiation such as electron rays. Crosslinking agents are used in amounts of 1.0–3.0 parts by weight.

The present invention is described in detail by way of the following examples but is not limited thereto.

EXAMPLES 1-15 AND COMPARATIVE EXAMPLES 1-13

The ingredients listed in the recipes shown under Examples 1-15 and Comparative Examples 1-5 were kneaded and the resulting compounds were fed into an extruder, from which they were extruded to coat, together with an inner semiconductive layer 0.7 mm thick of an ethylene-vinyl acetate copolymer, the outer periphery of stranded conductors (cross-sectional area $=100$ mm$^2$), to form an insulation coating 3 mm thick. Subsequently, the coated conductors of the examples except those prepared in Examples 6, 7 and 8 and Comparative Examples 6 and 7, were thermally crosslinked by passage through a dry crosslinking tube with nitrogen gas (10 kg/cm$^2$ and 240° C.) used as a heating medium. Thereafter, they were subjected to pressure cooling to produce the power cables.

EXAMPLE 1

| | |
|---|---|
| Low-density polyethylene (density, 0.920 g/cm$^3$; melt index, 1.0 g/10 min) | 100 parts by weight |
| 4,4'-Thiobis(3-methyl-6-tert-butylphenol) | 0.25 parts by weight |
| Dicumyl peroxide | 2.5 parts by weight |
| Lithium hydroxystearate | 0.005 parts by weight |
| Hydroxystearic acid | 0.5 parts by weight |

EXAMPLE 2

| | |
|---|---|
| Low-density polyethylene (density, 0.920 g/cm$^3$; melt index, 1.0 g/10 min) | 100 parts by weight |
| 4,4'-Thiobis(3-methyl-6-tert-butylphenol) | 0.25 parts by weight |
| Dicumyl peroxide | 2.5 parts by weight |
| Lithium hydroxystearate | 0.5 parts by weight |
| Hydroxystearic acid | 0.5 parts by weight |

EXAMPLE 3

| | |
|---|---|
| Low-density polyethylene (density, 0.920 g/cm$^3$; melt index, 1.0 g/10 min) | 100 parts by weight |
| 4,4'-Thiobis(3-methyl-6-tert-butylphenol) | 0.25 parts by weight |
| Dicumyl peroxide | 2.5 parts by weight |
| Calcium hydroxystearate | 0.005 parts by weight |
| Stearic acid amide | 0.1 parts by weight |

EXAMPLE 4

| | |
|---|---|
| Low-density polyethylene (density, 0.920 g/cm$^3$; melt index, 1.0 g/10 min) | 100 parts by weight |
| 4,4'-Thiobis(3-methyl-6-tert-butylphenol) | 0.25 parts by weight |
| Dicumyl peroxide | 2.5 parts by weight |
| Calcium hydroxystearate | 0.1 parts by weight |
| Hydroxystearic acid amide | 0.2 parts by |

EXAMPLE 5

| | |
|---|---|
| Low-density polyethylene (density, 0.920 g/cm³; melt index, 1.0 g/10 min) | 100 parts by weight |
| 4,4'-Thiobis(3-methyl-6-tert-butylphenol) | 0.25 parts by weight |
| Dicumyl peroxide | 2.5 parts by weight |
| Calcium hydroxystearate | 0.2 parts by weight |
| N,N'-Ethylenebis(hydroxystearic acid)amide | 0.2 parts by weight |

Comparative Example 1

| | |
|---|---|
| Low-density polyethylene (density, 0.920 g/cm³; melt index, 1.0 g/10 min) | 100 parts by weight |
| 4,4'-Thiobis(3-methyl-6-tert-butylphenol) | 0.25 parts by weight |
| Dicumyl peroxide | 2.5 parts by weight |

Comparative Example 2

| | |
|---|---|
| Low-density polyethylene (density, 0.920 g/cm³; melt index, 1.0 g/10 min) | 100 parts by weight |
| 4,4'-Thiobis(3-methyl-6-tert-butylphenol) | 0.25 parts by weight |
| Dicumyl peroxide | 2.5 parts by weight |
| Lithium hydroxystearate | 0.5 parts by weight |

Comparative Example 3

| | |
|---|---|
| Low-density polyethylene (density, 0.920 g/cm³; melt index, 1.0 g/10 min) | 100 parts by weight |
| 4,4'-Thiobis(3-methyl-6-tert-butylphenol) | 0.25 parts by weight |
| Dicumyl peroxide | 2.5 parts by weight |
| Calcium hydroxystearate | 0.5 parts by weight |

Comparative Example 4

| | |
|---|---|
| Low-density polyethylene (density, 0.920 g/cm³; melt index, 1.0 g/10 min) | 100 parts by weight |
| 4,4'-Thiobis(3-methyl-6-tert-butylphenol) | 0.25 parts by weight |
| Dicumyl peroxide | 2.5 parts by weight |
| Calcium ricinoleate | 1.0 part by weight |

Comparative Example 5

| | |
|---|---|
| Low-density polyethylene (density, 0.920 g/cm³; melt index, 1.0 g/10 min) | 100 parts by weight |
| 4,4'-Thiobis(3-methyl-6-tert-butylphenol) | 0.25 parts by weight |
| Dicumyl peroxide | 2.5 parts by weight |
| Lithium hydroxystearate | 0.005 parts by weight |
| Hydroxystearic acid | 0.5 parts by weight |

Comparative Example 6

| | |
|---|---|
| Low-density polyethylene (density, 0.920 g/cm³; melt index, 1.0 g/10 min) | 100 parts by weight |
| 4,4'-Thiobis(3-methyl-6-tert-butylphenol) | 0.25 parts by weight |
| Dicumyl peroxide | 2.5 parts by weight |
| Lithium hydroxystearate | 1.1 parts by weight |
| Hydroxystearic acid | 0.5 parts by weight |

EXAMPLE 6

| | |
|---|---|
| High-density polyethylene (density, 0.950 g/cm³; melt index, 0.4 g/10 min) | 100 parts by weight |
| 4,4'-Thiobis(3-methyl-6-tert-butylphenol) | 0.25 parts by weight |
| Lithium hydroxystearate | 1.0 part by weight |
| Montanic acid ester | 1.0 part by weight |

EXAMPLE 7

| | |
|---|---|
| High-density polyethylene (density, 0.950 g/cm³; melt index, 0.4 g/10 min) | 100 parts by weight |
| 4,4'-Thiobis(3-methyl-6-tert-butylphenol) | 0.25 parts by weight |
| Magnesium ricinoleate | 0.5 parts by weight |
| Hydroxystearic acid amide | 0.2 parts by weight |

Comparative Example 7

| | |
|---|---|
| High-density polyethylene (density, 0.950 g/cm³; melt index, 0.4 g/10 min) | 100 parts by weight |
| 4,4'-Thiobis(3-methyl-6-tert-butylphenol) | 0.25 parts by weight |
| Calcium ricinoleate | 0.5 parts by weight |
| Hydroxystearic acid | 0.004 parts by weight |

Comparative Example 8

| | |
|---|---|
| High-density polyethylene (density, 0.950 g/cm³; melt index, 0.4 g/10 min) | 100 parts by weight |
| 4,4'-Thiobis(3-methyl-6-tert-butylphenol) | 0.25 parts by weight |
| Calcium ricinoleate | 0.5 parts by weight |
| Hydroxystearic acid | 1.1 parts by weight |

EXAMPLE 8

| | |
|---|---|
| Polypropylene (density, 0.902 g/cm³; melt index, 1.3 g/10 min) | 100 parts by weight |
| 4,4'-Thiobis(3-methyl-6-tert-butylphenol) | 0.25 parts by weight |
| Calcium ricinoleate | 0.5 parts by weight |
| Hydroxystearic acid | 0.05 parts by weight |

EXAMPLE 9

| | |
|---|---|
| Ethylene-vinyl acetate copolymer (vinyl acetate content, 8 wt %; melt index, 3.0 g/10 min) | 100 parts by weight |
| 4,4'-Thiobis(3-methyl-6-tert-butylphenol) | 0.25 parts by weight |
| Dicumyl peroxide | 2.5 parts by weight |
| Calcium ricinoleate | 0.5 parts by weight |
| Hydroxystearic acid | 1.0 part by weight |

EXAMPLE 10

| | |
|---|---|
| Ethylene-vinyl acetate copolymer (vinyl acetate content, 8 wt %; melt index, 3.0 g/10 min) | 100 parts by weight |
| 4,4'-Thiobis(3-methyl-6-tert-butylphenol) | 0.25 parts by weight |
| Dicumyl peroxide | 2.5 parts by weight |
| Magnesium ricinoleate | 1.0 part by weight |
| N,N'-Ethylenebis(hydroxystearic acid)amide | 0.5 parts by weight |

Comparative Example 9

| | |
|---|---|
| Ethylene-vinyl acetate copolymer (vinyl acetate content, 8 wt %; melt index, 3.0 g/10 min) | 100 parts by weight |
| 4,4'-Thiobis(3-methyl-6-tert-butylphenol) | 0.25 parts by weight |
| Dicumyl peroxide | 2.5 parts by weight |
| Calcium hydroxystearate | 0.004 parts by weight |
| Hydroxystearic acid amide | 0.2 parts by weight |

Comparative Example 10

| | |
|---|---|
| Ethylene-vinyl acetate copolymer (vinyl acetate content, 8 wt %; melt index, 3.0 g/10 min) | 100 parts by weight |
| 4,4'-Thiobis(3-methyl-6-tert-b-utylphenol) | 0.25 parts by weight |
| Dicumyl peroxide | 2.5 parts by weight |
| Calcium hydroxystearate | 1.1 parts by weight |
| Hydroxystearic acid amide | 0.2 parts by weight |

EXAMPLE 11

| | |
|---|---|
| Low-density polyethylene (density, 0.920 g/cm³; melt index, 1.0 g/10 min) | 80 parts by weight |
| Ethylene-vinyl acetate copolymer (vinyl acetate content, 8 wt %; melt index, 3.0 g/10 min) | 20 parts by weight |
| 4,4'-Thiobis(3-methyl-6-tert-butylphenol) | 0.25 parts by weight |
| Dicumyl peroxide | 2.5 parts by weight |
| Calcium ricinoleate | 1.0 part by weight |
| Montanic acid | 0.05 parts by weight |

EXAMPLE 12

| | |
|---|---|
| Low-density polyethylene (density, 0.920 g/cm³; melt index, 1.0 g/10 min) | 80 parts by weight |
| Ethylene-vinyl acetate copolymer (vinyl acetate content, 8 wt %; melt index, 3.0 g/10 min) | 20 parts by weight |
| 4,4'-Thiobis(3-methyl-6-tert-butylphenol) | 0.25 parts by weight |
| Dicumyl peroxide | 2.5 parts by weight |
| Calcium hydroxystearate | 0.2 parts by weight |
| N,N'-Ethylenebis(hydroxystearic acid)amide | 0.005 parts by weight |

EXAMPLE 13

| | |
|---|---|
| Ethylene-ethyl acrylate copolymer (ethyl acrylate content, 7 wt %; melt index, 4.0 g/10 min) | 100 parts by weight |
| 4,4'-Thiobis(3-methyl-6-tert-butylphenol) | 0.25 parts by weight |
| Dicumyl peroxide | 2.5 parts by weight |
| Lithium hydroxystearate | 0.5 parts by weight |
| Montanic acid ester | 0.5 parts by weight |

EXAMPLE 14

| | |
|---|---|
| Ethylene-ethyl acrylate copolymer (ethyl acrylate content, 7 wt %; melt index, 4.0 g/10 min) | 100 parts by weight |
| 4,4'-Thiobis(3-methyl-6-tert-butylphenol) | 0.25 parts by weight |
| Dicumyl peroxide | 2.5 parts by weight |
| Calcium hydroxystearate | 0.5 parts by weight |
| N,N'-Ethylenebis(hydroxystearic acid)amide | 0.5 parts by weight |

Comparative Example 11

| | |
|---|---|
| Ethylene-ethyl acrylate copolymer (ethyl acrylate content, 7 wt %; melt index, 4.0 g/10 min) | 100 parts by weight |
| 4,4'-Thiobis(3-methyl-6-tert-butylphenol) | 0.25 parts by weight |
| Dicumyl peroxide | 2.5 parts by weight |
| Lithium hydroxystearate | 1.0 part by |

-continued

| | |
|---|---|
| Montanic acid ester | 1.1 parts by weight |

Comparative Example 12

| | |
|---|---|
| Ethylene-ethyl acrylate copolymer (ethyl acrylate content, 7 wt %; melt index, 4.0 g/10 min) | 100 parts by weight |
| 4,4'-Thiobis(3-methyl-6-tert-butylphenol) | 0.25 parts by weight |
| Dicumyl peroxide | 2.5 parts by weight |
| Magnesium ricinoleate | 0.2 parts by weight |
| Hydroxystearic acid amide | 0.004 parts by weight |

Comparative Example 13

| | |
|---|---|
| Ethylene-ethyl acrylate copolymer (ethyl acrylate content, 7 wt %; melt index, 4.0 g/10 min) | 100 parts by weight |
| 4,4'-Thiobis(3-methyl-6-tert-butylphenol) | 0.25 parts by weight |
| Dicumyl peroxide | 2.5 parts by weight |
| Magnesium ricinoleate | 0.2 parts by weight |
| Hydroxystearic acid amide | 1.1 parts by weight |

EXAMPLE 15

| | |
|---|---|
| Low-density polyethylene (density, 0.920 g/cm$^3$; melt index, 1.0 g/10 min) | 80 parts by weight |
| Ethylene-ethyl acrylate copolymer (ethyl acrylate content, 7 wt %; melt index, 4.0 g/10 min) | 20 parts by weight |
| 4,4'-Thiobis(3-methyl-6-tert-butylphenol) | 0.25 parts by weight |
| Dicumyl peroxide | 2.5 parts by weight |
| Magnesium ricinoleate | 0.2 parts by weight |
| N,N'-Ethylenebis(hydroxystearic acid)amide | 1.0 part by weight |

The conductors of the power cables fabricated from the compositions shown in the Examples and Comparative Examples were filled with water and the cables were then immersed in water, with an alternating voltage of 5 kV (50 Hz) being applied between the conductors and the water for 500 days. During the period of the voltage application, the temperature of the water was varied periodically from room temperature to 90° C. at intervals of 12 hours.

After completion of the voltage application, each of the samples was sliced and stained with a boiling aqueous solution of Methylene Blue for microscopic observation to check the number and size of bow-tie trees formed. At the same time, the surface of the electric wires after the completion of voltage application was examined both visually and by IR spectrophotometry, to determine the degree of "blooming" of the additives. The results are shown in Table 1.

TABLE 1

| Example No. | | Number of bow-tie trees formed (piece/cc) | Maximum length of bow-tie trees (μm) | Blooming of additives |
|---|---|---|---|---|
| Examples of the Invention | 1 | $4 \times 10^2$ | 210 | absent |
| | 2 | $9 \times 10^1$ | 180 | absent |
| | 3 | $4 \times 10^2$ | 270 | absent |
| | 4 | $2 \times 10^2$ | 190 | absent |
| | 5 | $8 \times 10^1$ | 100 | absent |
| | 6 | $3 \times 10^1$ | 90 | absent |
| | 7 | $4 \times 10^1$ | 110 | absent |
| | 8 | $2 \times 10^2$ | 220 | absent |
| | 9 | $1 \times 10^2$ | 240 | absent |
| | 10 | $1 \times 10^1$ | 90 | absent |
| | 11 | $2 \times 10^1$ | 100 | absent |
| | 12 | $2 \times 10^2$ | 200 | absent |
| | 13 | $1 \times 10^2$ | 190 | absent |
| | 14 | $7 \times 10^1$ | 130 | absent |
| | 15 | $5 \times 10^1$ | 100 | absent |
| Comparative Examples | 1 | $10^4 <$ | 750 | absent |
| | 2 | $8 \times 10^2$ | 420 | absent |
| | 3 | $8 \times 10^2$ | 300 | absent |
| | 4 | $9 \times 10^2$ | 400 | absent |
| | 5 | $9 \times 10^3$ | 410 | absent |
| | 6 | $2 \times 10^1$ | 80 | present |
| | 7 | $10^4 <$ | 530 | absent |
| | 8 | $4 \times 10^2$ | 270 | present |
| | 9 | $1 \times 10^3$ | 600 | absent |
| | 10 | $2 \times 10^1$ | 90 | present |
| | 11 | $9 \times 10^0$ | 60 | present |
| | 12 | $3 \times 10^3$ | 550 | absent |
| | 13 | $9 \times 10^1$ | 280 | present |

The samples prepared in Examples 1–15 contained both a metal salt of a fatty acid with a hydroxyl group in the molecule and a fatty acid or a derivative thereof in the amounts prescribed by the present invention. In all of these samples, only a small number of bow-tie trees were formed ($10^1$–$10^2$ pieces/cc), with their maximum length being small, too. As a further advantage, no blooming of the additive was observed.

The sample prepared in Comparative Example 1 did not contain any metal salts of fatty acids, so it experienced the formation of many bow-tie trees, the maximum length of which was considerable. The samples prepared in Comparative Examples 2–4 employed the metal salts of the fatty acids alone (without combining them with fatty acids or derivatives thereof), and the maximum length of the bow-tie trees formed in these samples was fairly large. The samples prepared in Comparative Examples 5–13 were outside the scope of the present invention in terms of the amount of at least one of the metal salt of the fatty acid and the fatty acid or derivative thereof. When the amounts of these additives were smaller than the lower limits specified by the present invention, the intended effect to prevent bow-tie treeing was not attainable. When their amounts exceeded the prescribed upper limits, the additives were prone to bloom out on the surface of the insulations.

As will be understood from the foregoing description, by incorporating a metal salt of an OH-group containing fatty acid in combination with a fatty acid or a derivative thereof in accordance with the present invention, an electric insulator having appreciably improved bow-tie tree resistance can be realized. Using this improved insulator, the long-term reliability of crosslinked polyethylene insulated cables for high voltages and various other electrical equipment can be further enhanced.

While the invention has been described in detail and with reference to specific embodiments thereof, it will be apparent to one skilled in the art that various changes and modifications can be made therein without departing from the spirit and scope thereof.

What is claimed is:

1. An electric wire or cable having improved bow-tie tree resistance which is coated with an insulating composition consisting essentially of 100 parts by weight of at least one polymer selected from the group consisting of low-density polyethylene, high-density polyethylene, polybutene, an ethylene-vinyl acetate copolymer, an ethylene-ethyl acrylate copolymer, an ethylene-methyl methacrylate copolymer and combinations thereof, (A) 0.005–1.0 part by weight of a metal salt of a fatty acid containing a hydroxyl group in the molecule, and (B) 0.005–1.0 part by weight of a fatty acid, a fatty acid ester, or a fatty acid amide, where the amount of components (A) and (B) used exhibits superior bow-tie tree effects as compared to the use of a corresponding amount of component (A) alone or component (B) alone.

2. A bow-tie tree resistant wire or cable according to claim 1, wherein the polymer is a low-density polyethylene.

3. A bow-tie tree resistant wire or cable according to claim 1, wherein the polymer is a high-density polyethylene.

4. A bow-tie tree resistant wire or cable according to claim 1, wherein the polymer is an ethylene-vinyl acetate copolymer.

5. A bow-tie tree resistant wire or cable according to claim 1, wherein the polymer is an ethylene-ethyl acrylate copolymer.

6. A bow-tie tree resistant wire or cable according to claim 1, wherein the polymer is a mixture of a low-density polyethylene and an ethylene-vinyl acetate copolymer.

7. A bow-tie tree resistant wire or cable according to claim 1, wherein the polymer is a mixture of a low-density polyethylene and an ethylene-ethyl acrylate copolymer.

8. A bow-tie tree resistant wire or cable according to claim 1, wherein the metal salt of the fatty acid containing a hydroxyl group in the molecule is calcium hydroxystearate.

9. A bow-tie tree resistant wire or cable according to claim 1, wherein the metal salt of the fatty acid containing a hydroxyl group in the molecule is magnesium ricinoleate.

10. A bow-tie tree resistant wire or cable according to claim 1, wherein the fatty acid is hydroxystearic acid.

11. A bow-tie tree resistant wire or cable according to claim 1, wherein the fatty acid ester is a montanic acid ester.

12. A bow-tie tree resistant wire or cable according to claim 1, wherein the fatty acid amide is stearic acid amide.

13. A bow-tie tree resistant wire or cable according to claim 1, wherein the fatty acid amide is hydroxystearic acid amide.

14. A bow-tie tree resistant wire or cable according to claim 1, wherein the fatty acid amide is N,N'-ethylenebis(hydroxystearic acid)amide.

15. A bow-tie tree resistant wire or cable according to claim 1, which further contains 0.01–1.0 part by weight of an antioxidant.

16. A bow-tie tree resistant wire or cable according to claim 15, wherein the antioxidant is 4,4'-thiobis(3-methyl-6-tert-butylphenol).

17. A bow-tie tree resistant wire or cable according to claim 1, which further contains 1.0–3.0 parts by weight of a crosslinking agent.

18. A bow-tie tree resistant wire or cable according to claim 17, wherein the crosslinking agent is dicumyl peroxide.